(12) United States Patent
Hagspiel et al.

(10) Patent No.: US 8,850,129 B2
(45) Date of Patent: Sep. 30, 2014

(54) MEMORY ORDERED STORE SYSTEM IN A MULTIPROCESSOR COMPUTER SYSTEM

(75) Inventors: Norbert Hagspiel, Wendlingen (DE); Matthias Klein, Boeblingen (DE); Ulrich Mayer, Weil im Schoenbuch (DE); Robert J. Sonnelitter, III, Wappingers Falls, NY (US); Gary E. Strait, Poughkeepsie, NY (US); Hanno Ulrich, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 12/822,331

(22) Filed: Jun. 24, 2010

(65) Prior Publication Data

US 2011/0320743 A1    Dec. 29, 2011

(51) Int. Cl.
*G06F 12/02* (2006.01)
*G06F 12/08* (2006.01)
*G06F 9/38* (2006.01)
*G06F 12/10* (2006.01)
*G06F 9/52* (2006.01)

(52) U.S. Cl.
CPC ........ *G06F 12/0815* (2013.01); *G06F 12/0862* (2013.01); *G06F 9/3842* (2013.01); *G06F 12/0831* (2013.01); *G06F 12/1054* (2013.01); *G06F 9/528* (2013.01); *G06F 12/0828* (2013.01); *G06F 2212/1016* (2013.01); *G06F 2212/507* (2013.01); *G06F 2212/621* (2013.01)

USPC .......... 711/150; 711/118; 711/141; 711/154; 711/155; 711/167; 711/168; 711/169

(58) Field of Classification Search
USPC .......... 711/118, 141, 154, 155, 167, 168, 169
See application file for complete search history.

(56) References Cited

U.S. PATENT DOCUMENTS

| 5,623,628 | A * | 4/1997 | Brayton et al. ............... 711/141 |
| 5,838,943 | A * | 11/1998 | Ramagopal et al. .......... 712/218 |
| 6,687,809 | B2 * | 2/2004 | Chowdhury et al. ......... 712/216 |
| 6,775,749 | B1 * | 8/2004 | Mudgett et al. .............. 711/146 |
| 7,383,409 | B2 * | 6/2008 | Steely et al. ................. 711/169 |
| 7,404,041 | B2 * | 7/2008 | Gara et al. ..................... 711/121 |
| 7,409,500 | B2 * | 8/2008 | Steely et al. ................. 711/119 |
| 7,472,260 | B2 * | 12/2008 | Lien et al. ..................... 712/225 |
| 7,836,262 | B2 * | 11/2010 | Gunna et al. .................. 711/143 |
| 7,849,290 | B2 * | 12/2010 | Cypher et al. ................ 712/216 |
| 7,877,630 | B1 * | 1/2011 | Favor et al. ..................... 714/20 |
| 8,352,712 | B2 * | 1/2013 | Bell et al. ....................... 712/225 |
| 2004/0073777 | A1 * | 4/2004 | Arnold et al. ................. 712/217 |
| 2005/0091121 | A1 * | 4/2005 | Charney et al. ................. 705/26 |
| 2007/0022253 | A1 * | 1/2007 | Cypher et al. ................ 711/141 |

* cited by examiner

*Primary Examiner* — Arpan P. Savla
(74) *Attorney, Agent, or Firm* — Cantor Colburn LLP; Margaret McNamara

(57) ABSTRACT

A system and computer implemented method for storing of data in the memory of a computer system in order at a fast rate is provided. The method includes launching a first store to memory. A wait counter is initiated. A second store to memory is speculatively launched when the wait counter expires. The second store to memory is cancelled when the second store achieves coherency prior to the first store to memory.

20 Claims, 7 Drawing Sheets

MEMORY ORDERED STORE SYSTEM IN A MULTIPROCESSOR COMPUTER SYSTEM

BACKGROUND

This invention relates generally to processing within a computing environment, and more particularly to a memory ordered store system that provides for speculative stores.

In a computing system within a Peripheral Component Interconnect Express (PCIe) environment, ordering rules ensure a uniformity to provide memory consistency. For example, when an input/output (I/O) adapter writes into system memory, using PCIe defined Posted Memory Write Requests, the updates in memory appear in order to the system software or device driver. In a typical I/O operation, an adapter writes a block of data followed by status into system memory. This operation usually requires several Posted Memory Write Requests and these requests must appear to the system software to be written in strict order in system memory. Therefore, if the system software polls the status waiting for a completion, it knows that any associated data previously written in system memory is valid. Interrupts from I/O adapters are called MSIs (Message Signaled Interrupts) and appear as Posted Memory Write Requests on the PCI interface. Because interrupts are Posted Memory Write Requests, they are also ordered with respect to other Posted Memory Write Requests and the other ordering rules described below. When the program receives an interrupt from an I/O adapter, it knows that all data and status information has been written in to memory and is valid.

Another ordering rule ensures that when an adapter writes data into system memory and then fetches data from the same system memory address, it observes the new data just written. Still another ordering rule ensures that when software reads data, perhaps just a single register in an adapter, when the read response is received by the software it knows that any previous Posted Memory Write data is visible in system memory. This rule is useful in synchronizing operation between the adapter and software.

The rate at which the I/O adapter may write to memory is limited by ordering rules that limit when a subsequent write may be launched. These rules ensure that that the resulting Posted Memory Write data is not seen by the software as being out of order. One rule sometimes referred to, as "strict serialization," does not allow a subsequent write to be launched until a final write response is received confirming the successful store to memory of the data at the desired address. If no error occurred in the first store to memory, the subsequent store to memory may be launched once the final write response is received. While strict serialization ensures that the stores to memory will be viewed in order, this process may be slower than desired due since only one store to memory may be written at a time. A second rule, sometimes referred to as "partially overlapped ordered stores" provides for the launching of a second store to memory once a coherency response is received from a first store to memory. The second store to memory will proceed unless the first store to memory ends in an error, in which case the second store to memory is cancelled. The partially overlapped ordered stores is useful in increasing the storage rate provided that the number of errors is within desired limits.

In some computer systems, including System z® servers offered by International Business Machines Corporation, implement higher performance I/O interfaces that have performance requirements for the ordered stores that can not be met by strict serialization or partially overlapped rules. For strict serialization systems, the rate at which stores to memory may be achieved is limited by time it takes to receive a final response. For partially overlapped systems, the rate at which stores to memory may be achieved is limited by the time is takes to receive a coherency response.

SUMMARY

According to one aspect of the invention, a computer implemented method of storing data in a computer system is provided. The method includes launching a store N to memory. A predetermined time period is waited. A store N+1 is launched to memory no later than an expiration of the predetermined time period. A computer determines the achievement of coherency by store N. The computer determines the achievement of coherency by store N+1. Store N+1 is cancelled when the store N+1 achieves coherency before the store N achieves coherency.

According to another aspect of the invention, an apparatus for ordered storing of data in a computer system is provided. The apparatus includes a memory and one or more controllers in communication with the memory. The one or more controllers are configured to perform a method. The method includes launching a store N to the memory. A predetermined time period is waited. A store N+1 is launched to the memory no later than an expiration of the predetermined time period. A computer determines the achievement of coherency by store N. The computer determines the achievement of coherency by store N+1. Store N+1 is cancelled when the store N+1 achieves coherency before the store N achieves coherency.

According to another aspect of the invention, a computer program product for executing a task in a computer system is provided. The computer program product includes a tangible storage medium readable by a processing circuit and storing instructions for execution by the processing circuit for performing a method. The method includes launching a store N to the memory. A predetermined time period is waited. A store N+1 is launched to the memory no later than an expiration of the predetermined time period. A computer determines the achievement of coherency by store N. The computer determines the achievement of coherency by store N+1. Store N+1 is cancelled when the store N+1 achieves coherency before the store N achieves coherency.

According to another aspect of the invention, a computer implemented method storing data in a computer system is provided. The method includes launching a store N. A computer initiates a wait counter. A computer generates a finished counting signal in response to the wait counter expiring. A store N+1 is launched no later than upon receipt of the finished counting signal. The store N+1 is canceled when the store N+1 achieves coherency before the store N achieves coherency.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Referring now to the drawings herein wherein like elements are numbered alike in the several FIGS..

DETAILED DESCRIPTION

Exemplary embodiments of the present invention provide a system and a method that provides for the launching of ordered stores to memory independent of the coherency response or final response of a previous store to memory while maintaining a proper storage order when viewed from software. In an exemplary embodiment, the stores to memory are launched at a predetermined rate. If a store to memory is obtained in a different order than the required ordering, the I/O controller executes a cancel protocol to cancel the out of order store, and the store is restarted. Similarly if a store to memory receives an error response, any subsequent ordered stores to memory are cancelled and error recovery initiated. In some embodiments, the recovery process may be the same as that described in commonly owned U.S. patent application Ser. No. 12/821,271 entitled "Memory Error Isolation and Recovery in a Multiprocessor Computer System" filed concurrently herewith, which is incorporated by reference herein in its entirety. In one embodiment, the time period between a first store to memory and a subsequent store is measured from the initiating command for the first store. In another embodiment, the time period between the first store to memory and a subsequent store is measured from a send data response on the first store. This system and method of maintaining ordered stores provides advantages in increasing the rate of data storage while simultaneously maintaining the required order needed for I/O interfaces such as a peripheral component interconnect express (PCIe) or Infiniband environments in which the system is implemented in according to an exemplary embodiment.

When accessing system memory, store ordering requires a level of serialization that prevents the memory subsystem to operate at full bandwidth. Exemplary embodiments of the present invention provide for multiple independent parallel ordered streams having a minimum delay period before launching even if a prior store to memory has not received a coherency response, thereby enabling the memory subsystem to achieve a higher bandwidth. The commands described herein can each be any one of a write or a read-modify-write command/request.

Figure 1:
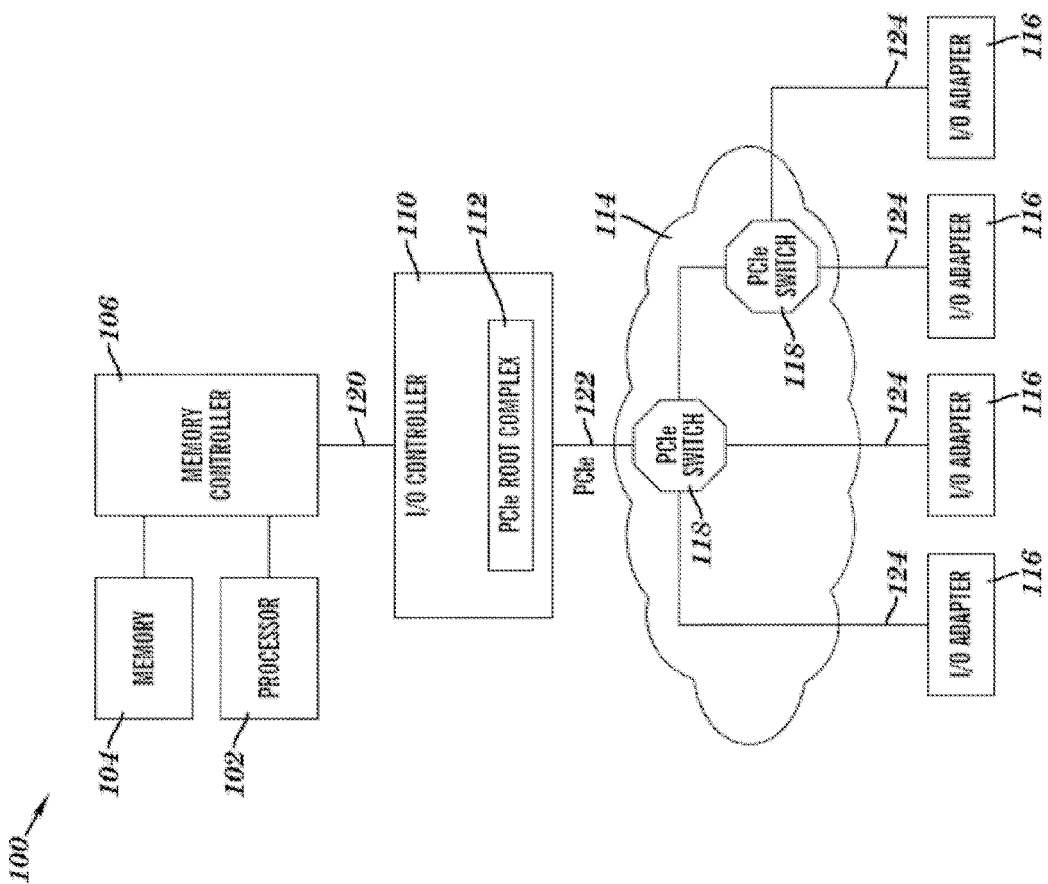
FIG. 1 depicts a block diagram of a computing system that may be implemented by an exemplary embodiment.

Turning now to FIG. 1, a block diagram of a computing system 100 in which exemplary embodiments of the present invention may be implemented. In an exemplary embodiment, the system 100 includes an ordered store to memory system in accordance with the present disclosure. In an exemplary embodiment, the system 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety.

In an exemplary embodiment, system 100 includes one or more processors 102 coupled to a system memory device 104 (main memory/computer memory) via a memory controller 106. To access system memory 104, a processor 102 issues a read, write or modify request that includes an address used to access system memory 104. When the system 100 is in operation, the processor 102 is configured to execute instructions stored within system memory 104, to communicate data to and from the system memory 104, and generally to control operations of the system 100 pursuant to the instructions. The processor 102 can be any custom made or commercially available processor, a central processing unit (CPU), an auxiliary processor among several processors associated with the computer system, a semiconductor based micro-processor (the form of a microchip or chip set), a macro-processors, or generally any device for executing instructions. In an exemplary embodiment, the processor comprises a combination of hardware and/or software/firmware with a computer program that, when loaded and executed, permits the processor 102 to operate such that it carries out the methods described herein. Although only one processor 102 is depicted, the system 100 may include additional processors. The processor 102 along with memory controller 106, and an I/O controller include the ordered store systems and methods as described herein.

Figure 2:
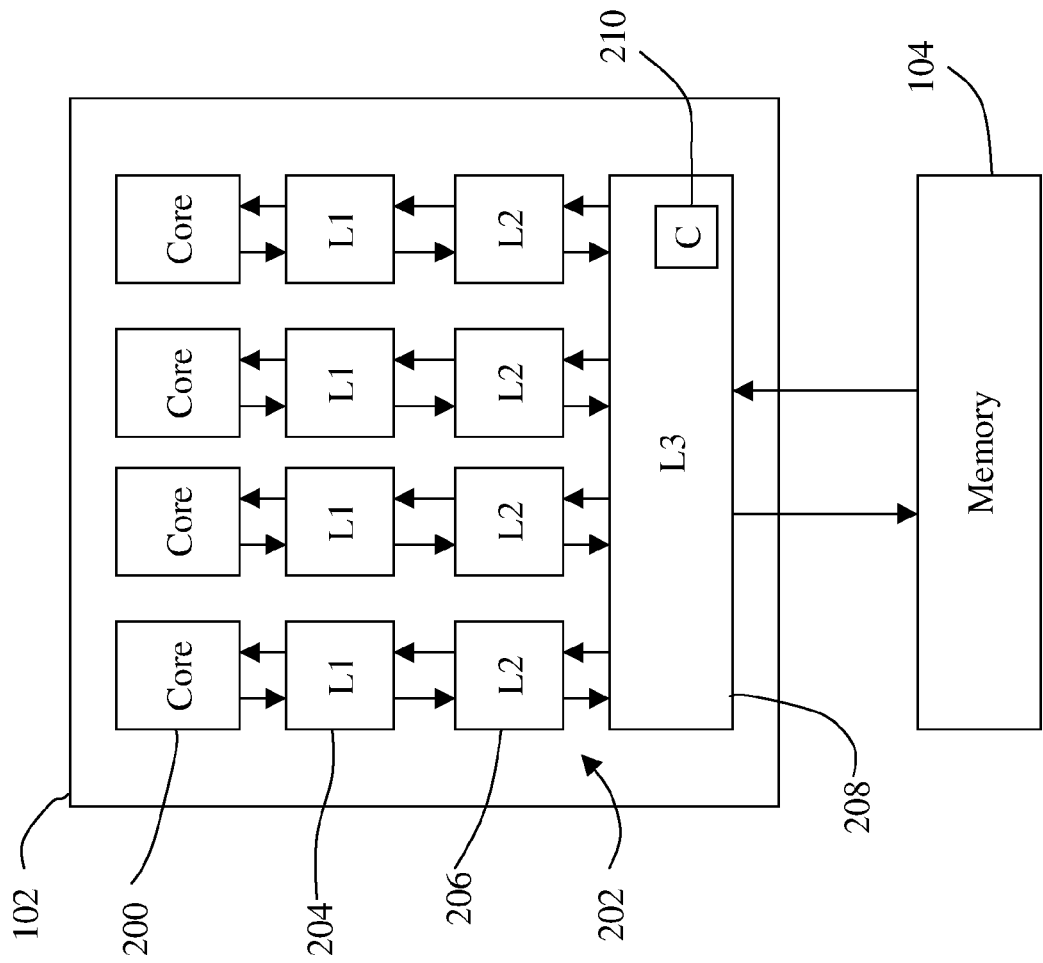
FIG. 2 depicts a block diagram of a processor that may be used in the computing system of FIG. 1.

In the exemplary embodiment, the processor 102 includes a plurality of cores 200 and cache memory device 202 as illustrated in FIG. 2. The cache memory 202 is arranged in multiple levels wherein there are two levels L1 cache memory device 204 and L2 cache memory device 206 are associated with a single core 200. The processor 102 also includes a L3 cache memory device 208 that is shared by the four cores 200. Cache memory 208 includes a memory controller 210 that maintains the ordered stores being received from the cores 200 or external memory, such as system memory 104 or another level of external cache memory for example. It should be appreciated that the four cores 200 illustrated for processor 102 are exemplary and the claimed invention should not be so limited. Embodiments of the processor 102 may have any number of cores 200. The cache memory 202 is a smaller, faster memory than system memory 104. The cache memory 202 is used to store copies of the data from the main memory locations. Through the use of cache memory 202, the average latency of memory accesses for the processor 102 will be closer to the cache latency than the latency of system memory 104. When the processor 102 needs to read from or write to a location in system memory 104, it first checks whether a copy of that data is in the cache memory 202. If so, the processor 102 reads from or writes to the cache memory 202, which is faster than reading from or writing to system memory 104. Checking for current copies of data, and establishing exclusive rights to update the data in a coherent fashion so that it is available to all other processors and I/O is known as coherency checking. Determining whether the data will be stored to system memory 104 or cache memory 202 is completed by the processors 102 and memory controller 106. A send data response 501 is returned to the I/O controller when it is determined where the data will be stored, and a coherency response 510 is returned to the I/O controller when ownership issues have been resolved. At this time the data is able to be stored to its final destination in system memory 104 or cache memory 202. As will be discussed in more detail herein, the writing of data to system memory 104 and cache memory 202 needs to maintain an ordered arrangement to maintain protocols of I/O controller. In some embodiments, the system 100 may also include a fourth level of cache memory (not shown) disposed between cache memory 208 and system memory 104 that may be shared by multiple processors 102.

The system 100 may comprise an I/O controller 110 with a root complex 112, which may be PCIe or Infiniband defined according to an exemplary embodiment. The system 100 may also comprise switching fabric 114 to route packetized communications between the root complex 112 and I/O adapters or peripheral devices 116. Switching fabric 114 may include a plurality of switching devices 118 to provide switching functionality. Communication path 120 couple the memory controller with the I/O controller 110, communication path 122 couple root complex 112 with switching devices 118, while communication paths 124 couple switching devices 118 with I/O adapters 116 each of which may require its stores to be completed in order. Although only two switching devices are illustrated in FIG. 1, the system may include any number of switching devices, which may be PCIe or Infiniband defined according to an exemplary embodiment. The communication path 122 can be a PCIe or Infiniband defined interface that allows one or more than one I/O adapter 116 to communicate with the I/O controller 110 via PCIe switches 118. This allows certain classes of errors that are caused by one adapter to not affect the other devices sharing the same PCIe interface.

In the exemplary embodiment, the cache memory 208 is an address-sliced type cache, built from multiple physically independent sub-caches, to provide improved performance. The slices are operated in parallel with different addresses. The cache memory 208 has two independent cache slices/sections, the first slice handles even addresses and the second slice handles odd addresses. The sliced cache memory arrangement provides advantages in improved performance. During operation, the first store in a sequence may be transmitted to the first slice while the second store is transmitted to the second slice, and the third store is transmitted to the first slice again. As will be discussed in more detail herein, the ordered store management is maintained by a finite state machine (FSM). The Store FSM and connected ordering logic see all of these stores, but since the cache memory is comprised of two slices, the cache handling the second store may not see either the first store or the third store at all. These multiple independent caches do not communicate, and therefore may not keep stores in order across the different cache memories. As will be described in more detail herein, the responses back from the caches to the Store FSMs provides advantages in keeping multiple independent cache slices in sync to get ordered stores done in the desired sequence.

In an exemplary embodiment, during operation, data is written to and retrieved from memory locations in the cache memory 202 and system memory 104 and provided to the processors 102. These stores are configured to comply with the I/O controller 110 requirement that the store to memory of data from the same IO adapter 116 appear in order in memory as seen by software. In general, the I/O controller 110 does not require strict serialization, but rather that the results of the stores from the same IO adapter 116 may not be seen out of order. Stores to memory from different IO adapters 116 may be completed in any order or in parallel. Ordered stores to memory may occur in parallel, provided that the original unmodified contents of a first target address may not be read after an updated second target address is available for read. Further, if an ordered store fails to complete due to an error, then subsequent ordered stores from the same IO adapter 116 may not be completed either.

In general, there are two methods of storing to memory, "Posted Write" and "Write with Done". In the Posted Write arrangement, the write command is sent, but no response signal is expected. The receiver, such as memory controller 106 for example, is expected to write the data and if any errors occur, the errors are managed locally. In a Posted Write arrangement, the ordered store management occurs locally as no "write done" signal is transmitted. In a Write with Done arrangement, a final result signal, whether there was success or an error, is returned to the sender. In a Write with Done arrangement, the sender participates in the management of the ordered stores and the handling of errors.

Figure 5:
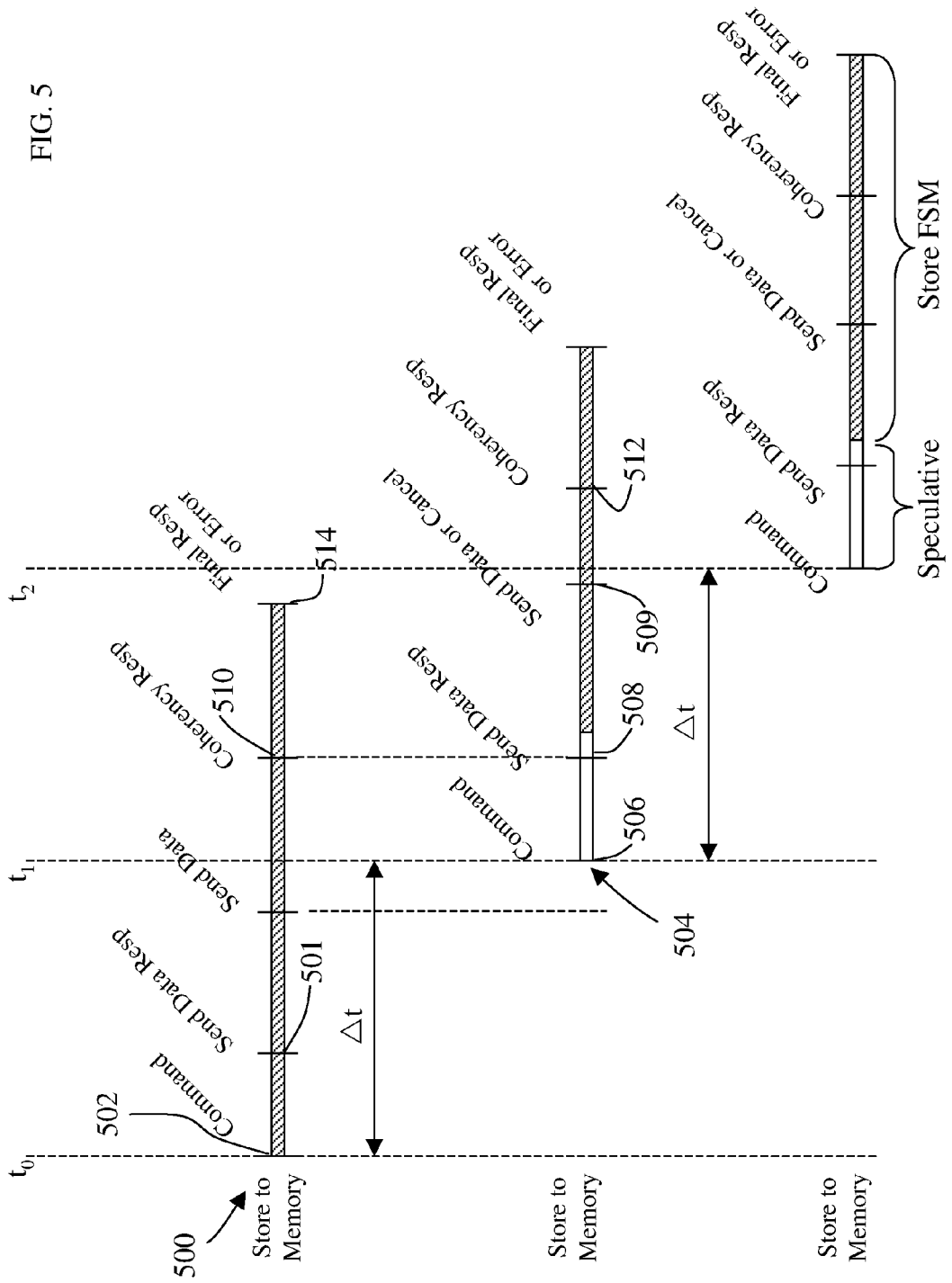
FIG. 5 depicts a timeline diagram illustrating exemplary stores to memory where the rate of stores is determined by a initiating command.
Figure 6:
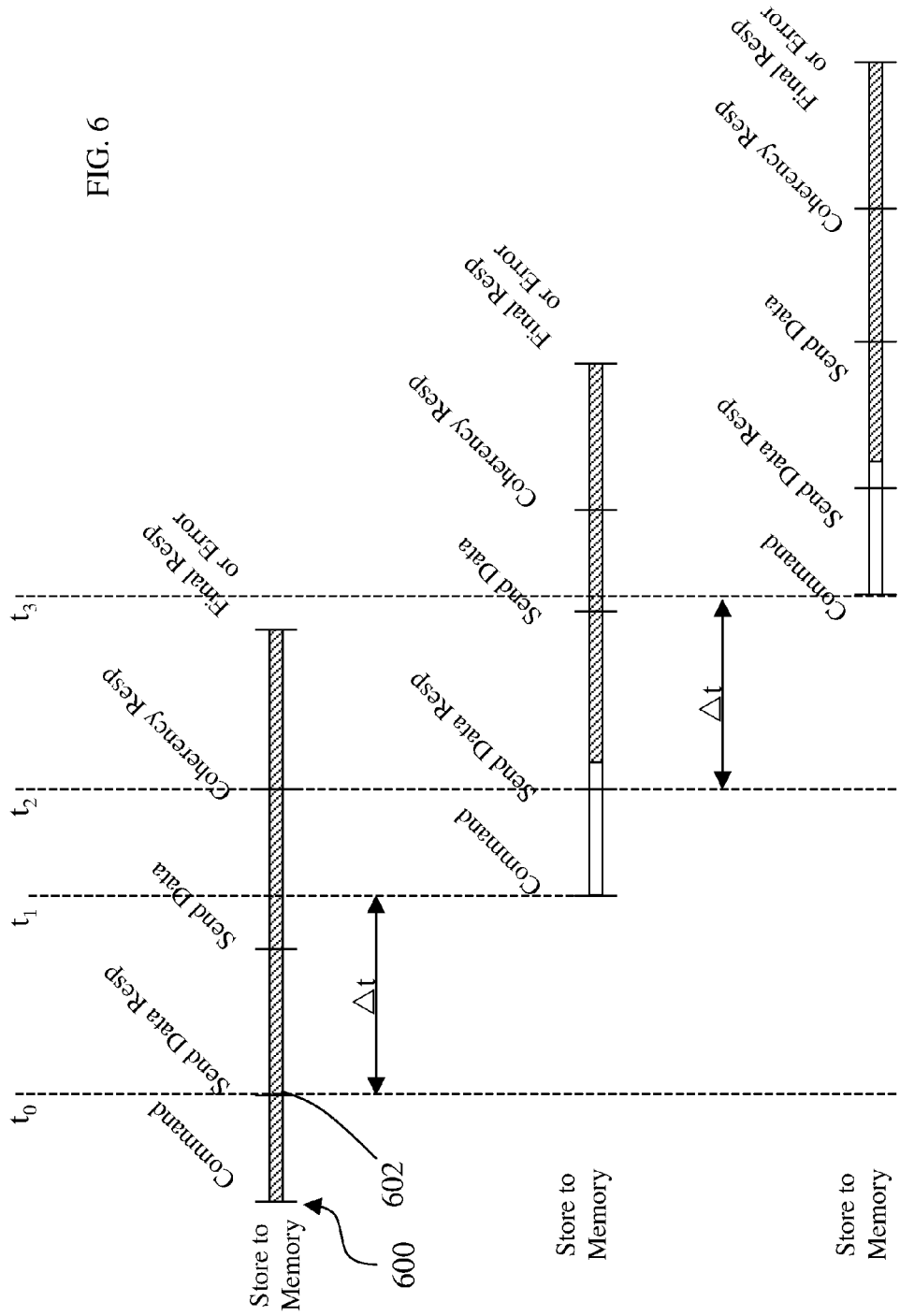
FIG. 6 depicts a timeline diagram illustrating an exemplary stores to memory where the rate of stores is determined by a send data response; and, FIG. 7 depicts a timeline diagram illustrating an exemplary stores to memory where a coherency response for a second store to memory is received prior to the coherency response of a first store to memory.
Figure 7:
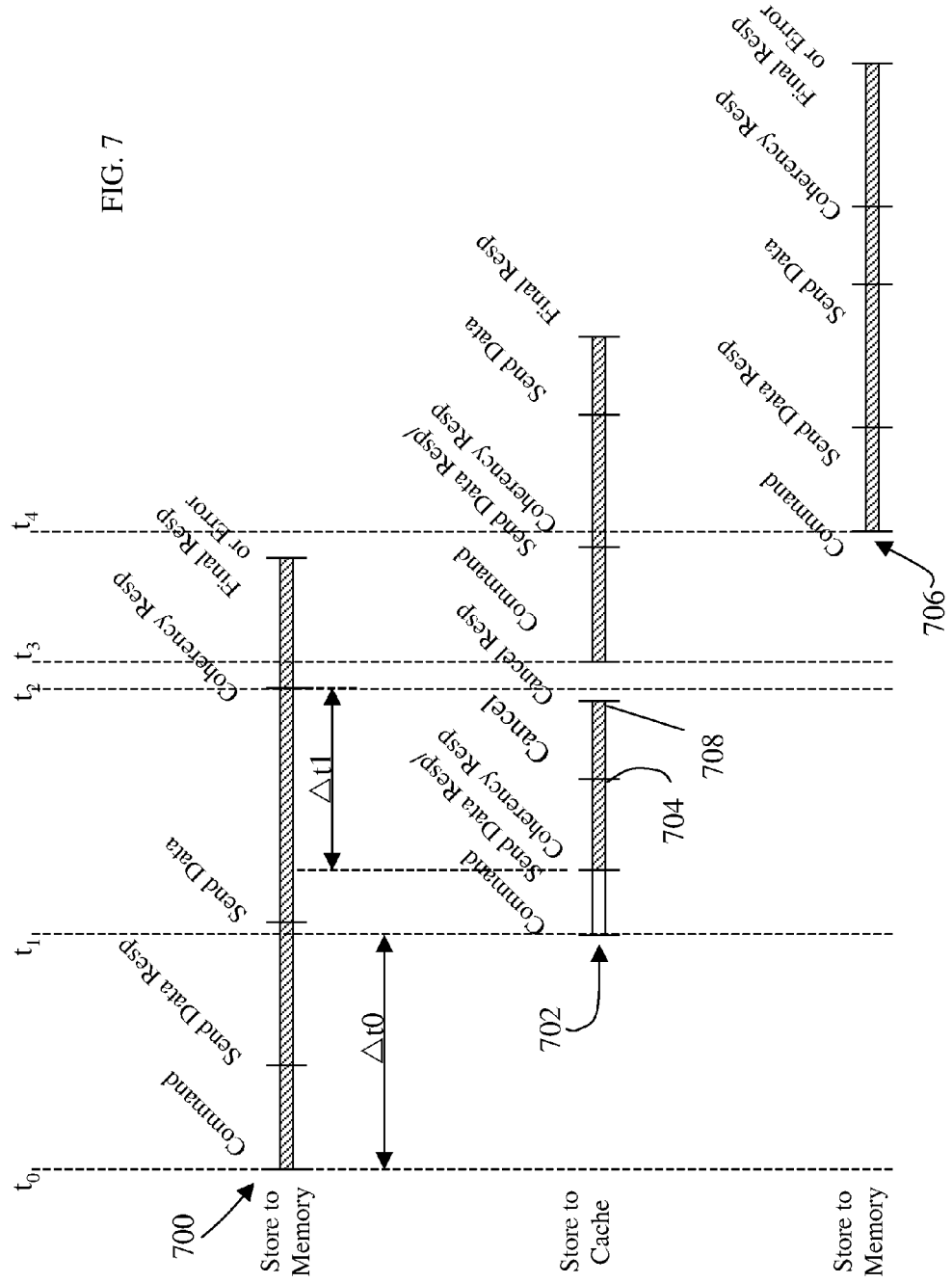

The store of data to memory has either four or five discrete stages depending on the type of memory being utilized as illustrated in FIG. 5-FIG. 7. When data is stored to system memory 104, the first stage is the transmitting of a Command to memory controller 106 initiating the store. The Command signal also requests resources such as a data buffer that may be needed to complete the store. In a second stage, a Send Data Response is then transmitted by the memory controller, and the transmission of data to the system memory 104 or cache memory 202 location is then allowed. The Send Data Response confirms that memory or cache controls have been prepared to receive data, and a data buffer has been reserved to receive the data. In a third stage, Send Data initiates transmission of data to store at the memory address.

A fourth stage is entered when a Coherency Response signal is received to indicate that the store has reached coherency. In some cases this can be coincident with the second stage or precede the third stage. As used herein, coherency means that no other updates are in process and the address is locked for store and protected against other reads or writes until the store is complete. The final stage is a Final Response signal indicating whether the data was successfully stored, or whether there was an error. It should be appreciated that in a Posted Write arrangement, the stages after the initial Command are managed locally.

When the store is to cache memory 202, such as the L3 cache memory 208 for example, two of the stages are combined. In cache memory 202, the memory 202 returns the Send Data Response signal and Coherency Response signal simultaneously. Similarly, when writing data to an atomic store (e.g. partial, bit set), the Send Data Response and Coherency Response are issued simultaneously.

Figure 3:
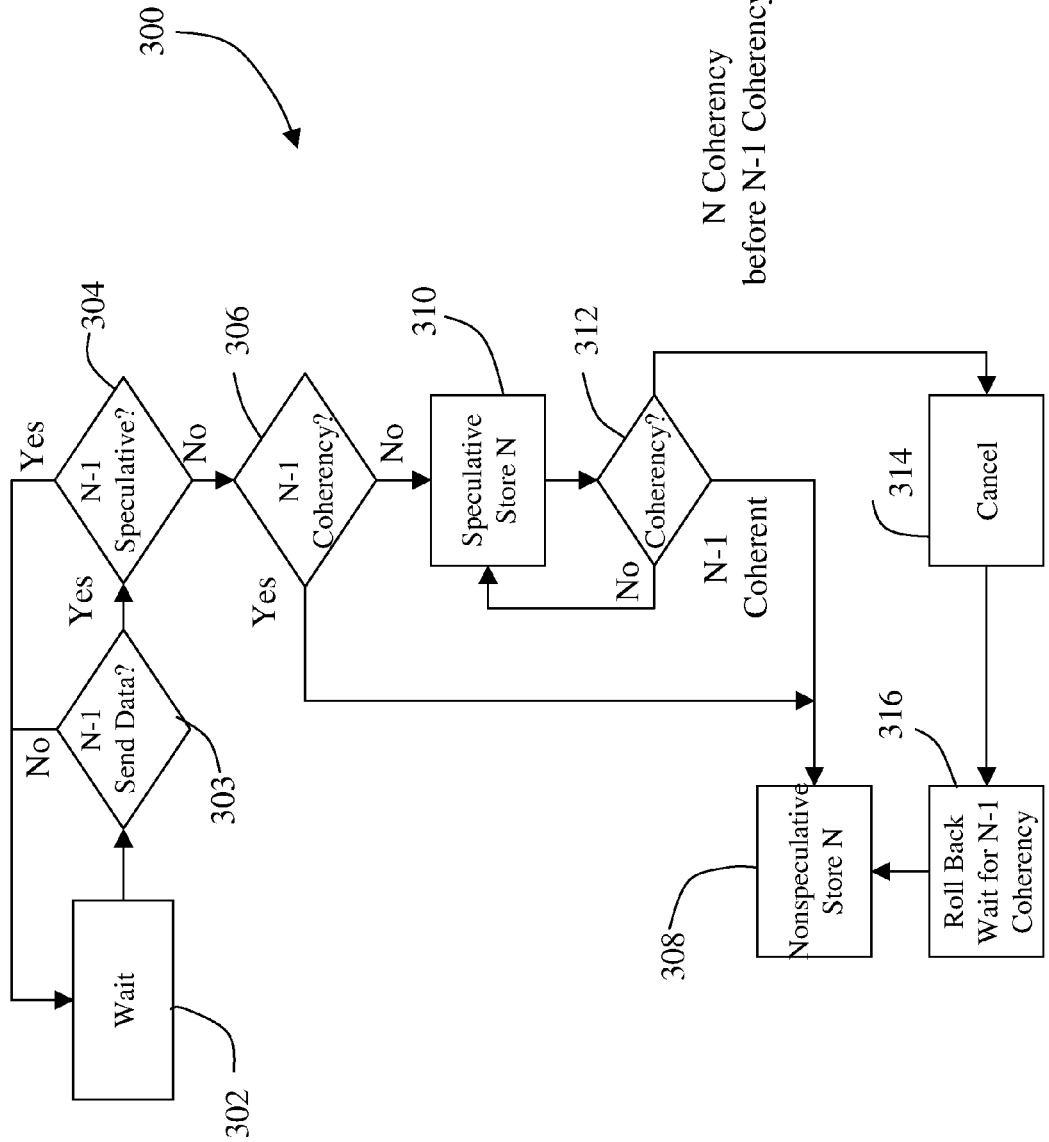
FIG. 3 depicts a flow diagram illustrating a method of ordered stores to memory that may be implemented by an exemplary embodiment.

Referring now to FIG. 3 and FIG. 5, process flow diagram for a method 300 of ordered stores is illustrated according to an exemplary embodiment of the invention. At block 302, the method 300 waits a predetermined number of cycles before launching the next ordered store. In one embodiment illustrated in FIG. 5, the time period ($\Delta t$) is measured from the Command Signal 502. In another embodiment illustrated in FIG. 6, the time period ($\Delta t$) is measured from the Send Data Response 602. The delay time period ($\Delta t$) is selected to obtain a desired store rate while reducing the probability that the coherency will be obtained out of order. It should be appreciated that while embodiments described herein refer to the delay period in terms of time, the claimed invention should not be so limited. The predetermined time period may also be defined by other triggering parameters, such as but not limited to processor cycles for example.

Once the time period ($\Delta t$) expires, the method 300 proceeds to query block 303 where it is determined if the prior store 500 (N−1) has reached the Send Data 501 point. Since the stores utilize shared resources in memory, query block 303 ensures that that the ordered stores do not deadlock on the shared resources in memory. If query block 303 returns a negative, the method 300 loops back to block 302. If query block 303 returns a positive, the method 300 proceeds to block 304 to determine if the prior store 500 (N−1) is still in a speculative state. In another embodiment, the wait block 302 may be terminated by method 300 by satisfying one of two criteria, either the time period (Δt) expires as discussed above, or by the prior store 500 (N−1) achieving coherency. If the query block 304 returns a positive, the method 300 loops back to block 302 until the prior store is no longer speculative. If query block 304 returns a positive, then the method 300 proceeds to query block 306.

Query block 306 determines whether the prior store (N−1) has achieved coherency. If query block 306 returns a positive, the method 300 proceeds to a nonspeculative store to memory 308. If query block 306 returns a negative, the method 300 proceeds to block 310 where a speculative store of the store 504 (N) is initiated. In one embodiment, the method 300 launches the store 504 (N) upon the earlier of the expiration of time period (Δt) or prior store (N−1) generating a coherency response. The speculative store 504 initiates with a Command 506 and proceeds to send a Send Data Response 508. The store 504 remains speculative until the prior store 500 (N−1) transmits a Coherency Response 510 as this allows the stores 500, 504 to have coherency in the correct order. The method 300 proceeds to query block 312 to check the coherency of the current store 504 (N) and the prior store 500 (N−1). If query block 312 returns negative, meaning that neither the current store 504 (N) nor the prior store 500 (N−1) has achieved coherency, then the method 300 loops back to block 310 and continues to speculatively store 504 (N). If the query block 312 determines that the prior store 500 (N−1) has achieved coherency, then the ordered store may be maintained and the method 300 proceeds to the nonspeculative store to memory in block 308 where the current store 504 (N) proceeds as a nonspeculative store.

If current store 504 (N) achieves coherency before the prior store 500 (N−1), however, then the ordered store rules have been violated and the method 300 proceeds to block 314 where current store 504 (N) is cancelled. The method 300 then moves to block 316 where the current store 504 (N) is rolled back and waits until the prior store 500 (N−1) achieves coherency. In one embodiment, the method 300 waits a predetermined time period before relaunching the current store (N). In one embodiment, this predetermined time period is the same length as the time period of block 302. In another embodiment, this predetermined time period may be based on other criteria that provides desired performance. In the exemplary embodiment, once the prior store 500 (N−1) achieves coherency, the current store 504 (N) may then proceed to a nonspeculative store to memory in block 308. In nonspeculative store to memory 308, the status of the prior store 500 (N−1) is monitored to ensure a successful response 514. If the prior store 500 (N−1) responds with an error, the current store 504 (N) initiates a cancel otherwise, the data is sent 509. In the exemplary embodiment, the Send Data or Cancel 509 occurs in time concurrently with or after transmission of Final Response 514 of the prior store 500 (N−1). In the exemplary embodiment, the speculative store to memory and nonspeculative store to memory are carried out in a finite state machine.

Another embodiment is illustrated in FIG. 6. This embodiment is similar to that illustrated in FIG. 5 except that the time period (Δt) of wait block 302 is initiated at the Send Data Response signal 602 rather than at the Command signal. Since the Send Data Response 602 has already been transmitted, the query block 303 may be eliminated from method 300. While this embodiment provides advantages in eliminating a step, the rate of stores may be limited when compared to the embodiment of FIG. 5.

It should be appreciated that while each block described above can individually be performed or executed by processor 102, by one or more controllers 106, 110, 210 or a combination thereof and should not be limited to any one embodiment or example described herein. Further, while the method 300 is illustrated as a linear sequence of steps, portions of the method 300 may also be carried out in parallel. The computing system 100 may also continuously perform the method 300 and may perform the method 300 in parallel on different memory devices within the computing system 100. Further, while embodiments herein illustrate only a single speculative store being launched, the claimed invention should not be so limited. In other embodiments, multiple speculative stores may be launched. In this embodiment, the order of the stores still needs to be maintained, and if one of the speculative stores achieves coherency out of order, or if the Final Response 514 is an error, then all of the subsequent speculative stores are cancelled and rolled back as discussed above.

It should further be appreciated that the embodiments of FIG. 6 and FIG. 7 illustrate a series of stores to system memory 104. As such, each store includes a Send Data Response and a separate Coherency Response. In embodiments having a series of stores to cache memory 202 or an atomic store, the Send Data Response and the Coherency Response are combined. In these embodiments, the system waits until the Send Data Response and then launches the next store.

Referring now to FIG. 7, another embodiment for achieving an ordered store is illustrated. In this embodiment, there is a mix of stores to both system memory 104 and cache memory 202. The system launches a first store 700 (N) to memory at time $t_0$. Once the delay time period (Δt0) has expired, the system launches a speculative store 702 to cache memory. Since the cache memory returns a combined Send Data Response and Coherency response, the speculative store 702 achieves coherency out of order, as the prior store 700 does not achieve a coherency until a period of time (Δt1) later at $t_2$. Since the speculative store is out of order, a cancel protocol 704 is executed and the store 702 is cancelled and rolled back. Once the prior store 700 achieves coherency at $t_2$, the store 702 is re-initiated. The subsequent store 706 is then initiated at time $t_4$ when the store 702 achieves coherency, or when the delay time period (Δt0) expires.

It should be appreciated that the embodiment of FIG. 7 may also be executed using the method illustrated in FIG. 6 where the time period (Δt0) is initiated from the Send Data Response rather than the Command signal.

Figure 4:
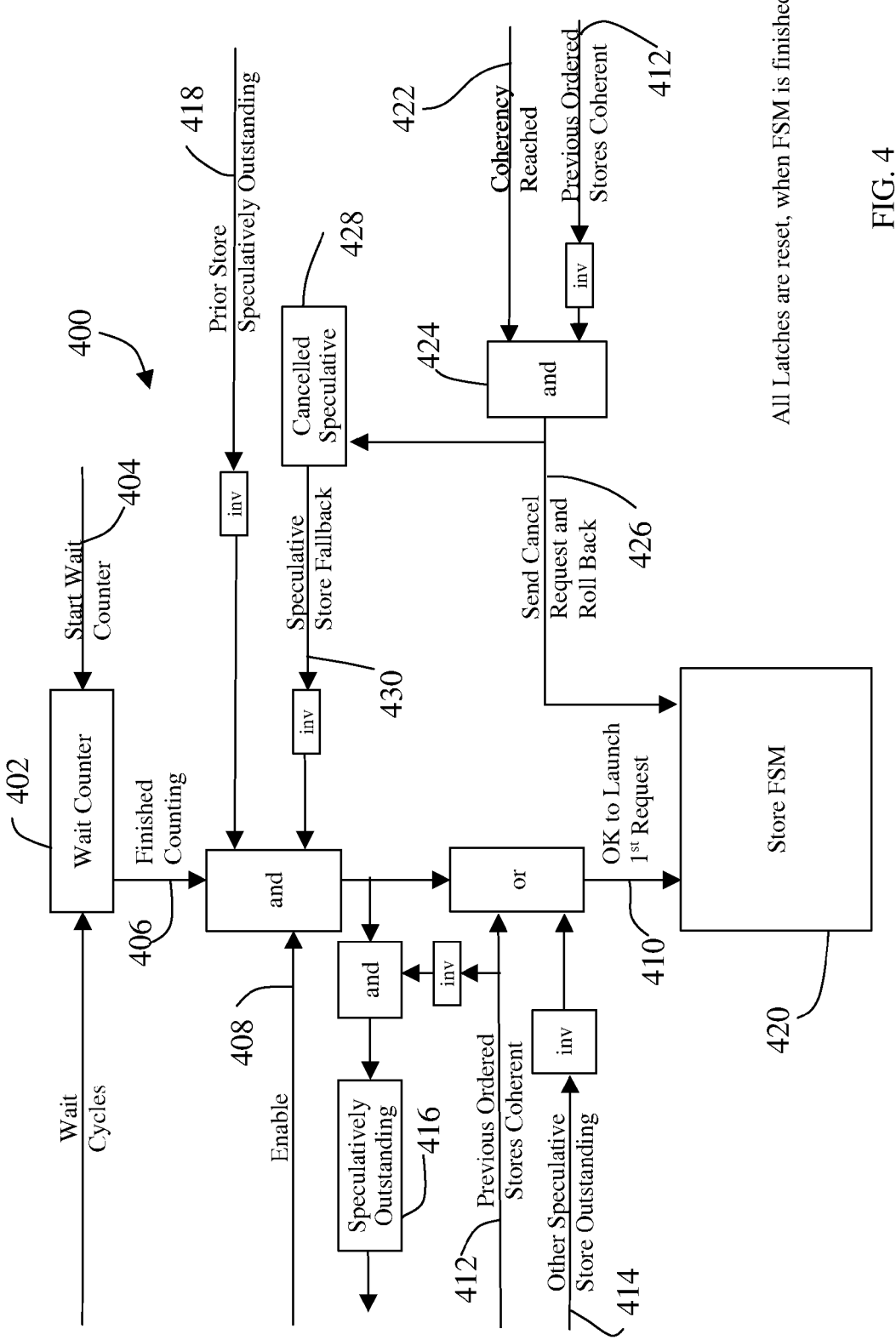
FIG. 4 depicts a data flow diagram illustrating a method of ordered stores to memory that may be implemented by an embodiment.

The system for ordered stores may also be represented as data flow processes 400 as illustrated in FIG. 4. FIG. 4 illustrates one such process. Each such process handles one store, and multiple processes 400 in communication with each other through signals 412, 414, 416, and 418 handle stores in parallel or overlapped or in order as required by the ordering rules. In this embodiment, a Wait Cycles block 402 waits a programmable number of cycles before launching the next ordered store. The number of cycles waited is a minimum delay needed if the prior store has not generated a coherency response. A Start Wait Counter signal 404 may be connected to either the initial Command signal (FIG. 5) or the Send Data Response (FIG. 6) of the prior ordered store. The signal 404 starts the Wait Counter 402. Once the programmed number of cycles has elapsed (e.g. the delay time period has expired), a Finished Counting signal 406 is generated. The signal 406 is combined with an Enable signal 408 that enables the speculative store function. These signals 406, 408 are ORed with other conditions that result in the generating of a "Launch 1$^{st}$ Request" signal 410. The other conditions may include a Previous Ordered Store Coherent signal 412 and an Other Speculative Store Outstanding signal 414.

The receipt of the signal 410 by the Store FSM 420 causes the next ordered store to be launched. If the store is launched with the Finished Counting signal 406 is asserted, but the Previously Ordered Store Coherent signal 412 not asserted, then the store is speculative and a Speculatively Outstanding latch 416 is set. In this embodiment, the setting of latch 416 prevents the launching of a subsequent or $3^{rd}$ ordered store from being launched. This is accomplished by the assertion of a Prior Store Speculatively Outstanding signal 418 as an input to the next ordered store. This has the effect of disabling the "Launch $1^{st}$ Request" signal 410 input into the Store FSM 420. This prevents the condition where multiple stores in an ordered sequence might need to be rolled back when one is detected out of order. This provides advantages in preventing wasted processing that results in restarted stores. In other embodiments, additional concurrent overlapping of ordered stores may be allowed to provide higher performance. In the present embodiment the Prior Store Speculatively Outstanding signal 418 is reset when the Previous Ordered Stores Coherent signal 412 is asserted. It should be appreciated that in other embodiments, multiple speculative stores may be launched in parallel and the latch 416 may be set by other criteria such as when the number of speculative stores exceeds a threshold for example.

When a condition is present where there may be a violation of the ordered store rules, the process 440 accounts for this condition by combing the Coherency Reached signal 422 with an inverse of the Previous Ordered Stores Coherent signal 412. When these conditions exist, the AND block 424 asserts a Send Cancel Request and Roll Back signal 426 to Store FSM 420. Further, a Cancelled Speculative latch 428 is set to prevent the Finished Counting signal 406 from launching another speculative request command.

In the embodiment of FIG. 7, the setting of latch 428 prevents the store 706 from launching, which would create a condition where the same store may be launched and cancelled repeatedly. This provides advantages in preventing an undesired amount of wasted retries in embodiments where some stores are much slower than others, however in other embodiments this may be allowed. The store 702 receives the Cancel signal 704 and returns a Cancel Response 708. When the Cancel Response 708 is received, the Store FSM 420 is placed in state where the Store FSM 420 may restart store 702 from the beginning. Since the Speculative Store Fallback 430 is being asserted the Launch $1^{st}$ Request signal 410 will only be asserted when the Previous Ordered Stores Coherent signal 412 is asserted. In the embodiment of FIG. 7, the relaunch of the store 702 is initiated once the Coherency Response of the store 700. The relaunched store 702 proceeds normally to completion.

In one embodiment, the delay time period ($\Delta t$) may be adjusted by the system 100. The system 100 may monitor the number of cancellations being issued. When the number of cancellations exceeds a threshold within a time period, the system 100 may increase the delay time period ($\Delta t$) to reduce the number of cancellations below a desired cancellation threshold. Since cancels waste cycles, this embodiment may provide advantages in increasing efficiency and storage rate.

Technical effects and benefits of embodiments include the launching of multiple stores in parallel while maintaining a desired ordered store sequence. This provides advantages in decreasing the amount of time to execute ordered stores and increase bandwidth in a computing system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "processing circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a task or a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method of storing data in a computer system, the storing comprising a store N and a store N+1, wherein store N is ordered to precede store N+1, the method comprising:
    launching store N to a main memory of the computer system, store N comprising a request to store first data in the main memory;
    initiating a first predetermined time period based on said launching of said store N;
    launching store N+1 to a cache of the computer system based on an expiration of said first predetermined time period, store N+1 comprising a request to store second data in the cache;
    determining, by said computer system, that said store N+1 achieves coherency; and,
    canceling said store N+1 based on said store N+1 achieving coherency before said store N achieves coherency.

2. The method of claim 1 further comprising:
    generating a send data response based on said store N being launched; and
    initiating said first predetermined time period based on said send data response.

3. The method of claim 1 further comprising:
    generating a command response based on said store N being launched; and
    initiating said first predetermined time period based on said command response.

4. The method of claim 1 further comprising:
    generating a combined send data and coherency response based on said store N+1 achieving coherency; and
    determining that said store N+1 achieves coherency based on said combined send data and coherency response.

5. The method of claim 1 further comprising relaunching said canceled store N+1 based on an expiration of a second predetermined time period.

6. An apparatus for ordered storing of data in a computer system, the storing comprising a store N and a store N+1, wherein store N is ordered to precede store N+1, said apparatus comprising:
    a main memory;
    a cache; and
    one or more controllers in communication with said main memory and said cache, said one or more controllers configured to perform a method comprising:
    launching store N to the main memory, store N comprising a request to store first data in the main memory;
    initiating a first predetermined time period based on said launching of said store N;
    launching store N+1 to the cache based on an expiration of said first predetermined time period, store N+1 comprising a request to store second data in the cache;
    determining, by said computer system, that said store N+1 achieves coherency; and,
    canceling said store N+1 based on said store N+1 achieving coherency before said store N achieves coherency.

7. The apparatus of claim 6, further comprising:
    generating a send data response based on said store N being launched; and
    initiating said first predetermined time period based on said send data response.

8. The apparatus of claim 6, further comprising:
generating a command response based on said store N being launched; and
initiating said first predetermined time period based on said command response.

9. The apparatus of claim 6, further comprising:
generating a combined send data and coherency response based on said store N+1 achieving coherency; and
determining that said store N+1 achieves coherency based on said combined send data and coherency response.

10. The apparatus of claim 6 further comprising relaunching said canceled store N+1 based on an expiration of a second predetermined time period.

11. A computer program product for executing a task in a computer system, the computer program product comprising:
a tangible non-transitory storage medium readable by a processing circuit and storing instructions comprising a store N and a store N+1, wherein store N is ordered to precede store N+1, for execution by the processing circuit for performing a method comprising:
launching store N to a main memory of the computer system, store N comprising a request to store first data in the main memory;
initiating a first predetermined time period based on said launching of said store N;
launching store N+1 to a cache of the computer system based on an expiration of said first predetermined time period, store N+1 comprising a request to store second data in the cache;
determining, by said computer system, that said store N+1 achieves coherency; and,
canceling said store N+1 based on said store N+1 achieving coherency before said store N achieves coherency.

12. The computer program product of claim 11, further comprising:
generating a send data response based on said store N being launched; and
initiating said first predetermined time period based on said send data response.

13. The computer program product of claim 11, further comprising:
generating a command response based on said store N being launched; and
initiating said first predetermined time period based on said command response.

14. The computer program product of claim 11, further comprising:
generating a combined send data and coherency response based on said store N+1 achieving coherency; and
determining that said store N+1 achieves coherency based on said combined send data and coherency response.

15. The computer program product of claim 11 relaunching said canceled store N+1 based on an expiration of a second predetermined time period.

16. A computer implemented method storing data in a computer system, the storing comprising a store N and a store N+1, wherein store N is ordered to precede store N+1, the method comprising:
launching a store N to a main memory of the computer system, store N comprising a request to store first data in the main memory;
initiating, by the computer, a wait counter based on the launching of store N;
generating, by said computer, a finished counting signal based on said wait counter expiring;
launching a store N+1 to cache of the computer system based on receipt of said finished counting signal, store N+1 comprising a request to store second data in the cache; and,
canceling said store N+1 based on said store N+1 achieving coherency before said store N achieves coherency.

17. The method of claim 16, further comprising setting a cancelled speculative latch in response to said canceling of said store N+1.

18. The method of claim 16, further comprising setting a speculatively outstanding latch in response to said finished counting signal and when said store N has not achieved coherency.

19. The method of claim 16 further comprising, based on said store N achieving coherency before expiration of said wait counter, launching said store N+1 based on store N achieving coherency.

20. The method of claim 16 wherein:
generating a response comprising one of a send data response and a command response based on launching said store N; and,
initiating said wait counter based on said response being generated.

* * * * *